No. 615,204. Patented Nov. 29, 1898.
C. YOUNG.
TRUCK.
(Application filed July 23, 1898.)
(No Model.)
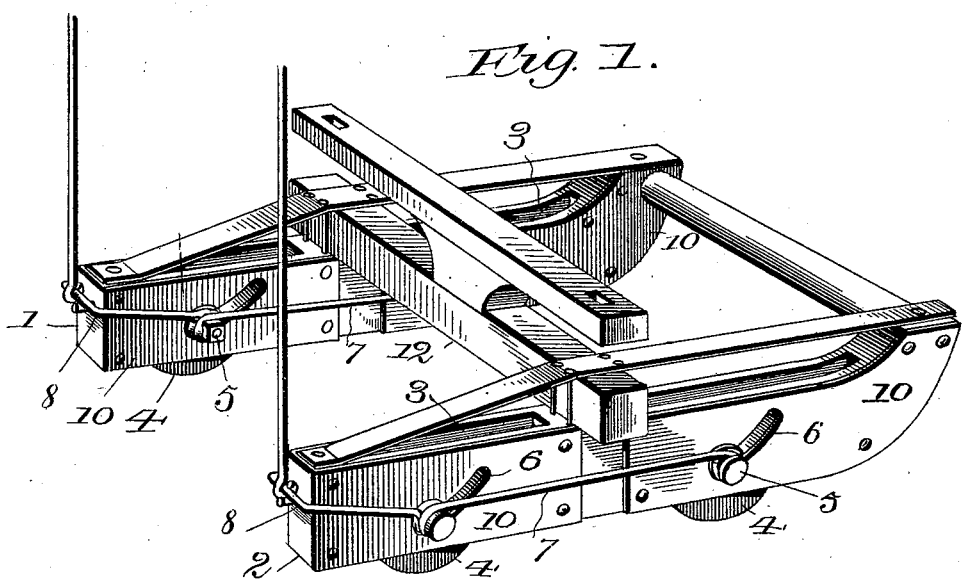
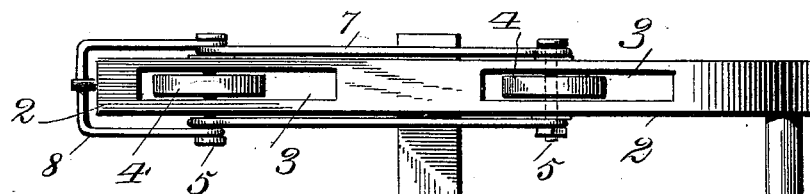
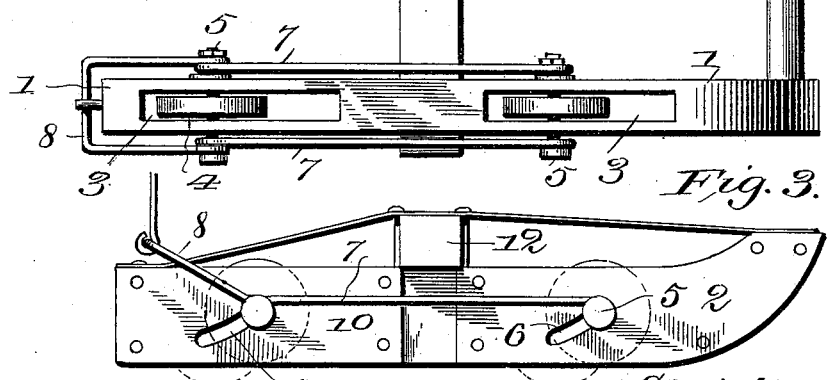
Witnesses
L. C. Hills.
H. L. Ames.
Inventor:
Christian Young,
by V. D. Stockbridge
Attorney

UNITED STATES PATENT OFFICE.

CHRISTIAN YOUNG, OF MENDOTA, MINNESOTA.

TRUCK.

SPECIFICATION forming part of Letters Patent No. 615,204, dated November 29, 1898.

Application filed July 23, 1898. Serial No. 686,741. (No model.)

*To all whom it may concern:*

Be it known that I, CHRISTIAN YOUNG, a citizen of the United States, residing at Mendota, in the county of Dakota and State of Minnesota, have invented certain new and useful Improvements in Combination-Trucks; and I do hereby declare the following to be a full, clear, and exact description of the invention, such as will enable others skilled in the art to which it appertains to make and use the same.

This invention relates to a novel combination-truck for vehicles, and has for its object the production of a simple and ingenious truck which may be readily converted from an ordinary wheel-truck to a runner or sleigh truck designed for use in winter.

To the accomplishment of this object the invention consists in constructing a truck with a pair of parallel runners suitably protected by metallic strips and within which are mounted wheels journaled in adjustable bearings, suitable means being provided for effecting the adjustment of the bearings and for fixing them in their adjusted positions to permit the wheels to project below the runners or to be elevated out of contact with the ground when it is desired to use the vehicle as a sleigh.

Referring to the drawings, Figure 1 is a perspective view of my truck complete. Fig. 2 is a bottom plan view thereof, and Fig. 3 is a side elevation showing the wheels raised into the runners.

Referring to the numerals on the drawings, 1 and 2 indicate a pair of parallel runners provided, respectively, with a pair of longitudinal slots 3, extending through the top and bottom of the runners and located adjacent to their opposite ends. Within these slots 3 I mount wheels or rollers 4, journaled, respectively, upon transverse shafts 5, extending through the runners and laterally movable or adjustable in upwardly and forwardly inclined and slightly-curved bearing-slots 6. The shafts are provided with journal-boxes, if desirable; but I have illustrated the simplest embodiment of my invention, which simply comprehends the employment of the shafts having nuts screwed upon their opposite ends and suitable washers being interposed between the nuts and the sides of the runners to retain the shafts against longitudinal displacement. The front and rear shafts mounted in each runner are connected, upon opposite sides thereof, by connecting-rods 7, and the rear shafts are connected to the ends of bails 8, which when turned down around the rear extremities of said runners retain the shafts in the lower or rear ends of the slots and fix the wheels in their lowest adjustments when it is desired to have the device mounted upon the wheels.

Suitable catches are preferably provided for retaining the bails in their proper positions, and it will be observed that the connecting-rods compel the wheels carried by each runner to move in unison in order that they may at all times be in horizontal alinement. In order to prevent the shafts from wearing the runner, which is preferably constructed of some light material—as, for instance, wood—I mount slotted metallic plates 10 upon the sides of the runners, and I protect the bottoms of the latter with protective plates, usually designated "runner-irons," which reduce the frictional contact of the device when employed as a sleigh to a minimum. These plates are of course provided with longitudinal slots corresponding to the slots through the runners and accommodating the several wheels. The runners constructed and equipped in the manner specified are connected by any suitable framework—as, for instance, the cross-beam 12, bolted to the runners and additionally secured by straps extending over the cross-beam and secured at their opposite ends to the opposite ends of the runners, suitable tie-bolts being preferably provided adjacent to the sides of the cross-beam for drawing the strap down firmly. This cross-beam receives, as usual, the king-bolt of the vehicle, constituting the device a truck, two or more of which are usually employed, although it is obvious that a single truck might in some instances be effective. The front ends of the runners are additionally braced by a cross-beam located intermediately, and the bails are provided with suitable lifting-rods, which extend upwardly into the body of the vehicle and constitute means whereby the bails may be released or latched in place as it is desired to use the device as a sleigh or as a wheeled vehicle.

It will be observed that in practice the bails are latched behind the runners and that the wheels are thus retained in their depressed positions. If, now, it is desired that the device be converted into a sleigh, it is simply necessary to raise the bail above the runner, when, as is apparent, the weight of the vehicle will cause the shafts to move upwardly into the slots until the runners rest upon the ground, and it is not necessary to lock the device in this position, as the weight of the vehicle will always retain the wheels in their elevated positions unless secured by the bails.

By the employment of the construction illustrated and described I am enabled to produce a combination-truck which may be readily converted into a bob for a sleigh or into a wheeled truck at will; but while the present embodiment of my invention appears to be preferable I do not desire to limit myself to the structural details set out, but reserve the right to change, modify, or vary them at will within the scope of the protection prayed.

Having thus described my invention, what I claim as new, and desire to secure by Letters Patent, is—

1. In a combination-truck, the combination with a pair of runners, provided with longitudinal slots, of vertically-adjustable wheels mounted within said slots, and designed when elevated to be entirely inclosed within the runners, substantially as specified.

2. In a combination-truck, the combination with a pair of runners, provided with longitudinal slots, of vertically-adjustable wheels mounted within said slots, and mechanism upon the exterior of said runners for securing the wheels in their adjusted positions, substantially as specified.

3. In a combination-truck, the combination with a pair of runners provided with transverse inclined slots, of shafts adjustable within said slots, wheels mounted upon said shafts and located within longitudinal slots in said runners, and means for securing the shafts in their depressed positions, substantially as specified.

4. In a combination-truck, the combination with a pair of runners provided with transverse inclined slots, of shafts adjustable within said slots, wheels mounted upon the shafts and located within longitudinal slots in the runners, means for connecting the shafts carried by each runner, and bails secured to one of said shafts, and designed to be turned down behind one end of the runner to secure the wheels in their depressed positions, substantially as specified.

5. In a combination-truck, the combination with a pair of runners provided with transverse inclined slots, of shafts movable within said slots, wheels carried by said shafts and located within longitudinal slots in the runners, connecting-rods extending upon each side of said runners and connected to the shafts, bails spanning each of the runners respectively, and secured at their opposite ends to the opposite extremities of the rear shafts, and bail-securing mechanism carried upon one extremity of the runners and designed to secure the bails in position to retain the wheels in their depressed positions, substantially as specified.

6. The combination with runners, of vertically-adjustable wheels, bails coöperating with and designed to engage the runners for securing the wheels in their adjusted positions, and means for actuating said bails, substantially as specified.

7. The combination with a pair of runners provided with inclined transverse slots, and with longitudinal slots extending through the top and bottom of the runners, shafts mounted in the inclined slots, wheels mounted upon the shafts and movable in the longitudinal slots, and slotted protective plates secured upon the runners, substantially as specified.

In testimony whereof I affix my signature in presence of two witnesses.

CHRISTIAN YOUNG.

Witnesses:
F. G. B. WOODRUFF,
GEO. CUNNINGHAM.